Nov. 16, 1926.                                                        1,607,185
                          E. E. CORMIER ET AL
                            CONTROL DEVICE
                        Filed March 13, 1925      2 Sheets-Sheet 1
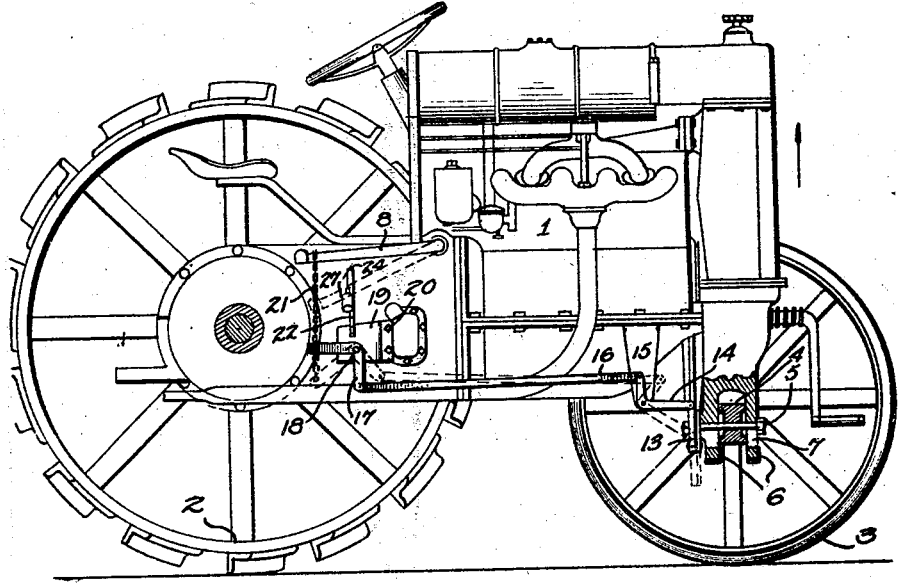
Fig. 1.
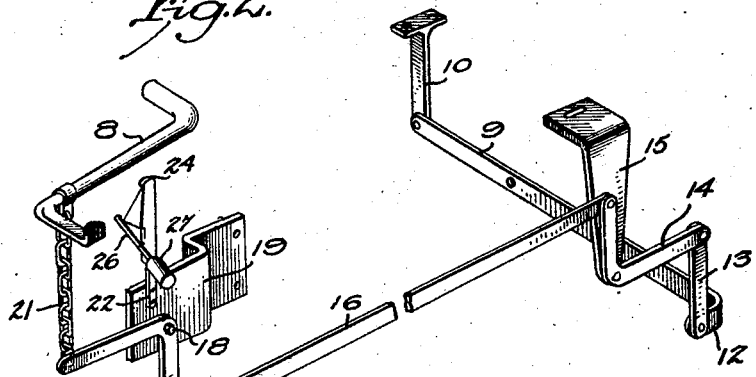
Fig. 2.
Fig. 3.
Inventor
E. EDMUND CORMIER
JOHN S. SONGER
Attorney Nov. 16, 1926. 1,607,185
E. E. CORMIER ET AL
CONTROL DEVICE
Filed March 13, 1925 2 Sheets-Sheet 2
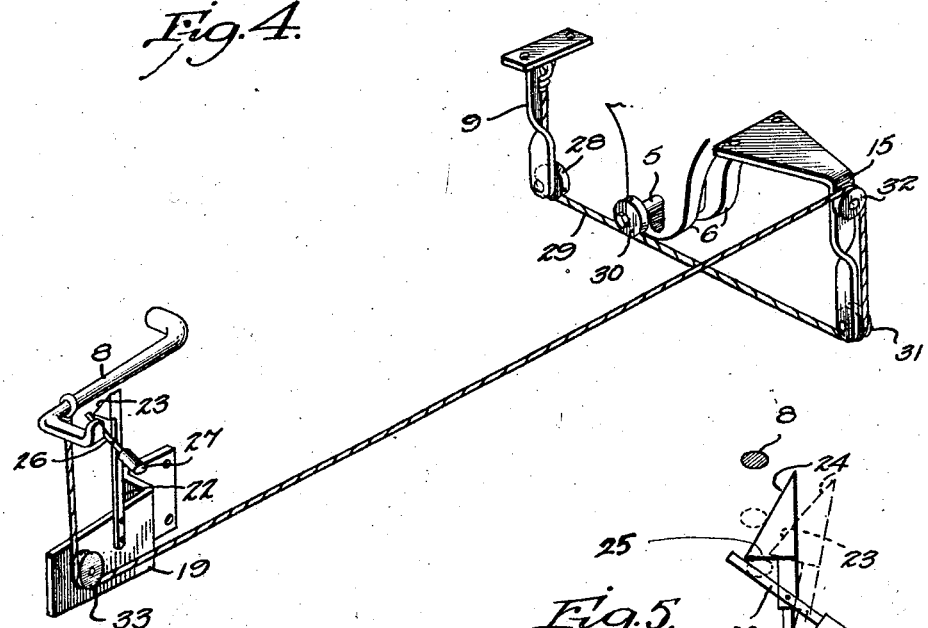
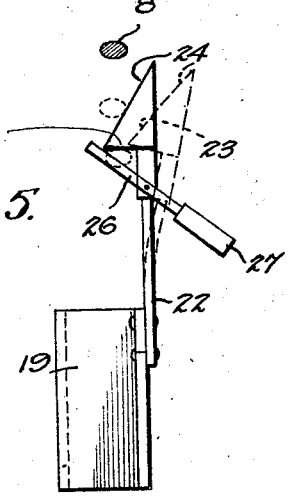
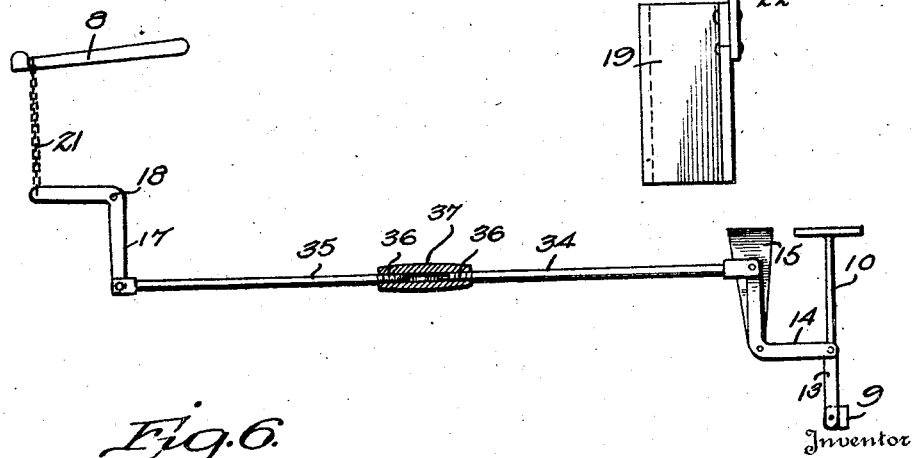
Inventor
E. EDMUND CORMIER
JOHN S. SONGER
By
Attorney Patented Nov. 16, 1926.

1,607,185

UNITED STATES PATENT OFFICE.

ELOI EDMUND CORMIER AND JOHN S. SONGER, OF ORANGE, MASSACHUSETTS.

CONTROL DEVICE.

Application filed March 13, 1925. Serial No. 15,373.

This invention relates to control devices, and more particularly to means for automatically releasing the clutch of a tractor when the front end of the tractor moves upwardly.

In certain makes of tractors, the front end has a tendency to lift when the agricultural implement or other tool meets an obstruction and if the power is not shut off, the entire frame of the tractor will pivot around the rear axle and tip over.

In the present invention, we provide a control mechanism for a tractor consisting of a lever connected to the front part of the tractor and pivoted on a member carried by the front axle together with suitable connecting means, whereby movement of the lever due to relative movement of the tractor body and front wheel construction will release the clutch and thus cut off the power being applied to the rear wheels.

An object of the invention is the provision of suitable locking mechanism whereby the clutch will be retained in inoperative position until it is released by the operator.

In the accompanying drawings, we have shown several embodiments of the invention. In this showing:

Figure 1 is a side elevation of a tractor showing the invention applied, parts being shown in section, Figure 2 is a perspective view of the control mechanism and clutch pedal, Figure 3 is a front elevation of a portion of the tractor showing the invention applied, Figure 4 is a perspective view similar to Figure 2, of another form of the invention, Figure 5 is a front elevation of the locking mechanism, and, Figure 6 is a side elevation of another form of the invention.

Referring to the drawings, the reference numeral 1 designates the engine of a tractor of ordinary construction, by means of which power is applied to the rear wheels 2 for the purpose of driving it. The tractor is further provided with front wheels 3 mounted on an axle 4, and the axle is connected to the tractor by means of a bolt or pin 5, which is received in openings in the cylinder front cover 6. As shown, (see Figure 1), the cylinder front cover extends on each side of the axle and in place of the usual opening for the bolt 5, we provided elongated slots 7. The tractor is further provided with a clutch pedal 8 which is normally in the full line position shown in Figure 1. To release the clutch, it is necessary to apply sufficient force to the pedal to move it to the dotted line position shown.

In the form of the invention shown in Figures 1 to 3 of the drawings, we provide a transverse lever 9, arranged in the rear of the front axle and connected at one end to an arm 10, which is bolted to the engine crank case or other part of the tractor construction. The lever 9 is provided with an opening 11 which is adapted to receive the bolt 5 to pivotally support it. The other end of the lever is extended rearwardly, as at 12, and is connected to a link 13. This link is in turn connected to a bell crank lever 14, pivotally mounted on a bracket 15, supported by the engine. As shown, the other end of the bell crank lever is connected to a rearwardly extending lever or link 16 and this link is in turn connected to a second bell crank lever 17. The bell crank lever 17 is pivoted on a pin 18, carried by a plate 19 and this plate is supported in any suitable manner on the tractor. As shown, the plate may be secured to the foot bracket by means of bolts 20.

The other end of the bell crank lever 17 is connected to a chain 21 which is in turn connected to the clutch pedal. Suitable means are provided for locking the clutch pedal in released position when it is moved downwardly. As shown, (see Figure 5) a resilient arm 22 is connected to the plate 19 and extends upwardly in a plane just beyond the plane of the clutch pedal. This arm carries a cam 23 having an inclined face 24, adapted to be engaged by the clutch pedal when it moves downwardly as indicated in dotted lines in Figure 5 of the drawings, and when the clutch pedal reaches the bottom of the cam, it is adapted to rest beneath its lower face 25. An arm 26 is pivotally mounted on the resilient arm 22 and is provided with a weight 27 at one end.

In Figure 4 of the drawings, we have shown another form of the invention, in which the links and levers are replaced by a flexible cable. As shown, the arm or bracket 9 carries a roller or pulley 28 at its lower end and a cable 29 passes over this pulley and is secured to the arm. The cable then passes over a pulley 30 carried by the bolt 5 and extends across the front of the tractor to a pulley 31, carried on the lower end of the arm 15. The cable then extends upwardly over a second pulley 32, carried by the arm 15 and then extends rearwardly over a pulley 33 carried by the supporting plate 19. Thence the cable is extended upwardly and connected to the clutch pedal.

In Figure 6 of the drawings, I have shown a construction substantially similar to the construction shown in Figures 1 to 3, except that the link 16 is replaced by a pair of tubular rods 34 and 35. The adjacent ends of these rods are threaded, as at 36, and are adapted to receive a turn-buckle 37 which permits adjustment.

In the operation of the form of the invention shown in Figures 1 to 3 of the drawings, any upward movement of the front end of the tractor causes the bolt 5 to move from its normal position at the top of the slot 7 to the bottom. This movement takes place before the front wheels 3 leave the ground and causes the link 9 to swing on its pivot. This exerts a downward pull on the forward end of the bell crank lever 14 and moves the link 16 forwardly to swing the bell crank lever 17 in a counter clockwise direction and move the clutch pedal to the dotted line position shown in Figure 1 of the drawings, thus releasing the clutch. When the clutch moves downwardly, the arm 22 is swung to the dotted line position shown in Figure 5 of the drawings, until the clutch pedal passes the lower end of the cam face 24, when it springs back to its original position and locks the clutch in an inoperative position.

The arm 26 serves to guide the clutch pedal past the lower face of the cam 23 when the clutch is to be reengaged. In the operation of the usual form of tractor, it is only necessary to depress the clutch pedal a slight distance to disengage the clutch, and the lower face of the cam 23 is arranged at the point where the pedal will be when the clutch becomes disengaged. When the operator desires to reengage the clutch, the pedal is further depressed until it rides over the end of the arm 26. When the pedal is then released, it rides upwardly over the face of the arm 26 and clears the lower face of the cam 23 to return to its normal, operative position.

In the form of the invention shown in Figure 4 of the drawings, the operation is substantially the same except that the relative movement of the tractor frame and the front wheels is transmitted to the clutch pedal by the cable 29 passing over the guide pulleys.

The operation of the form of the invention shown in Figure 6 of the drawings is the same as that heretofore described. The provision of the turn buckle 37 permits the device to be adjusted when installed or at any other time for the purpose of taking up wear.

It is to be understood that the forms of our invention herewith shown and described are to be taken as preferred examples of the same, and that various changes in the shape, size, and arrangement of parts may be resorted to without departing from the spirit of the invention or the scope of the subjoined claims.

We claim:

1. An attachment for tractors comprising a member connected to the tractor frame adjacent its front end and operatively connected to the front axle whereby relative movement of the front end of the frame and the axle will cause said member to be actuated, said member being operatively connected to the clutch pedal to release the clutch upon actuation of said member, a resilient arm arranged in a plane adjacent the path of movement of the clutch pedal, an enlargement formed on the end of said arm, said enlargement being provided with a cam face adapted to be engaged by the clutch pedal and being further provided with a lower face adapted to engage said clutch pedal to retain it in inoperative position, and means for releasing said clutch pedal upon further downward movement.

2. A device constructed in accordance with claim 1 wherein said releasing means comprises a lever pivoted to said arm, one end of said lever projecting beyond the edge of said enlargement, and the opposite end of said lever is provided with a weight to normally retain said first mentioned end in raised position.

In testimony whereof, we affix our signatures.

E. EDMUND CORMIER.
JOHN S. SONGER.